US008166394B1

(12) United States Patent
Melnicki (10) Patent No.: US 8,166,394 B1
(45) Date of Patent: Apr. 24, 2012

(54) SYSTEMS AND METHODS FOR IMPLEMENTING AND USING EVENT TRACKING AND ANALYTICS IN ELECTRONIC CONTENT

(75) Inventor: Michael Melnicki, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 394 days.

(21) Appl. No.: 12/564,418

(22) Filed: Sep. 22, 2009

(51) Int. Cl.
*G06F 3/00* (2006.01)
*G06F 17/00* (2006.01)

(52) U.S. Cl. ......... 715/700; 715/723; 715/716; 715/200

(58) Field of Classification Search .................. 715/700, 715/723, 716, 200, 719, 201
See application file for complete search history.

(56) References Cited

U.S. PATENT DOCUMENTS

| | | | |
|---|---|---|---|
| 2007/0266305 A1* | 11/2007 | Cong et al. | 715/500.1 |
| 2008/0222531 A1* | 9/2008 | Davidson et al. | 715/736 |
| 2009/0055725 A1* | 2/2009 | Portnov et al. | 715/234 |
| 2009/0228572 A1* | 9/2009 | Wall et al. | 709/218 |

* cited by examiner

*Primary Examiner* — Ting Lee
(74) *Attorney, Agent, or Firm* — Kilpatrick Townsend & Stockton LLP (57) ABSTRACT

A tool or other feature is provided during electronic content creation that allows the designer or other content creator to configure analytics for electronic content being created. For example, an analytics tool icon may be selected from a palette of other common tools used during content creation. In response, the user's mouse takes on a specific look to indicate to the content creator that he or she can now begin implementing analytics. The content creator can then click various objects within their content, select corresponding events to track, and otherwise specify the details of the analytics that he or she wishes to add to the content. As a specific example, after selecting a component on a content development canvas, a component-specific dialog box is displayed showing a menu that allows the creator to instrument various events associated with the component with analytics.

20 Claims, 7 Drawing Sheets

SYSTEMS AND METHODS FOR IMPLEMENTING AND USING EVENT TRACKING AND ANALYTICS IN ELECTRONIC CONTENT

FIELD

This disclosure generally relates to computer software that creates, edits, runs, displays, provides, or otherwise uses electronic content.

BACKGROUND

There are several companies that provide analytics services for web, application, and other electronic content. Such analytics can track the occurrence of certain events and other information relating to the actual use of electronic content by end users. For example, an application can be configured to provide such information to an analytics or other collection service through the end users' network connections. Collecting analytic type information about application use can be beneficial because it provides a better understanding of how end users are using the application and how frequently certain features are being used. For example, for a video, it may be useful to track how many people start watching, watch for 30 seconds, and watch the entire video. Analytics can be used to determine that a majority of an application's end users never access a certain screen or a certain set of utilities. The next release of the application can be reorganized accordingly. Collecting analytics can also allow an advertiser to see how effective their advertising application is in terms of end users interacting with it.

It can be difficult for non-developers to instrument applications to track events for analytic purposes. Historically, implementing an application or other content with tracked events that result in information being sent to an analytics service has been in the domain of software developers because it has required writing specific code into the application to generate the sending of the information. Generally, implementing analytics has not been sufficiently supported with graphical user interface (GUI) or other features and thus has required at least some level of coding and/or technical sophistication to implement analytics. Among other things, there is a need to make tracking of events for analytic purposes more accessible to non-programmers and other content creators, who are collectively referred to herein as "electronic content designers" or simply "designers" for convenience.

SUMMARY

Systems and methods are disclosed that make events analytics more accessible and/or easier for electronic content designers. Implementing applications and other content can be made easier by providing an analytics tool within a content creation software package. Such an analytics tool can enable or facilitate a designer's ability to implement analytics by allowing the designer to utilize a GUI and/or various menus to specify the details of tracking an event for analytics purposes. The designer may thus be able to implement analytics with less technical sophistication than might otherwise be required, for example, to implement or enhance such an tracking and analytics by writing program code. Improved analytic features can thus be provided in designer-targeted content creation software, such as software typically used to create the visual appearance of objects used in electronic content. More generally, improved content creation software packages can benefit content creation generally, including providing benefits to those who are technically sophisticated, by reducing the time and effort necessary to implement analytics.

One exemplary embodiment comprises a method of providing a user interface for creating electronic content. The user interface has a canvas for displaying objects used in electronic content being created. The user interface also has various tools for editing the appearance and functionality of those graphical objects. The method involves receiving input to add analytics to a selected object of content being created and, in response, presenting events associated with the selected object that can be tracked. The exemplary method further comprises receiving input selecting one of the presented events as a tracked event and generating code implementing tracking of the tracked event. Tracking an event generally comprises sending information about occurrences of the event when the content is used, i.e., by end users, to a collector such as a collection service.

These exemplary embodiments are mentioned not to limit or define the disclosure, but to provide examples of embodiments to aid understanding thereof. Embodiments are discussed in the Detailed Description, and further description is provided there. Advantages offered by the various embodiments may be further understood by examining this specification.

BRIEF DESCRIPTION OF THE FIGURES

These and other features, aspects, and advantages of the present disclosure are better understood when the following Detailed Description is read with reference to the accompanying drawings, wherein.

DETAILED DESCRIPTION

A tool or other feature is provided during electronic content creation that allows the designer or other content creator to configure analytics for electronic content being created. For example, an analytics tool icon may be selected from a palette of other common tools used during content creation. In response, the user's mouse takes on a specific appearance to indicate to the content creator that he or she can now begin implementing analytics. The content creator can then click various objects within the content, select corresponding events to track, and otherwise specify the details of the analytics that he or she wishes to add to the content. As a specific example, after selecting a component on a content development canvas, a component-specific dialog box is displayed showing a menu that allows the content creator to instrument various events associated with the component to be tracked to provide analytics.

If a creator selects a video, a menu displaying various events associated with the video can be displayed, such as, when the video starts playing, when the video plays to completion, after the video plays for 5, 10, 15, or n number of seconds (where n is a creator defined value), when certain keyframes within the video occur, etc. If the creator selects a button, a menu displaying button specific events can be displayed, such as, events associated with the button being clicked, hovered over with a mouse pointer, released, etc. If the creator selects an audio component, a menu displaying audio component specific events can be displayed, such as, events associated with audio start, audio completion, timing events in the audio, etc. If the creator selects the entire application or piece of content, a menu displaying associated events can be displayed, such as, events associated with the application starting, the application stopping, the application obtaining focus, the application losing focus, the application being resized, etc.

Generally, if the creator selects any user interface object for which analytics are available, the user is presented with options for implementing tracking of one or more of the events associated with that selected object. The presented options can identify which event or events will result in information being sent to an analytics system, whether any custom event should be added, naming of analytics added for events, various parameters with respect to how and when the event is sent to an analytics or collection service, and/or what information should be sent to the analytics system, among other things. Providing a name for each analytics facilitates editing and use of tracked information. For example, a user may name an analytic-implemented event: "Video 1 beginning," "Button 4 pressed," etc., to allow the tracked event occurrences to be easily identified.

Providing an analytics tool in a content creation environment provides many benefits particularly in content creation environments that designers often use to implement the appearance and interface features of electronic content being created. Designers can use such an analytics tool to easily instrument their applications and other electronic content to send information to various analytics and collection services to learn about how users are interacting with the content. Providing such a tool may also facilitate and improve the use of analytics by providing an easier mechanism for identifying the best event and information to use for the content creator's analytics requirements.

These illustrative examples are given to introduce the reader to the general subject matter discussed herein and are not intended to limit the scope of the disclosed concepts. The following sections describe various additional embodiments and examples.

Illustrative Computing Environment

Figure 1:
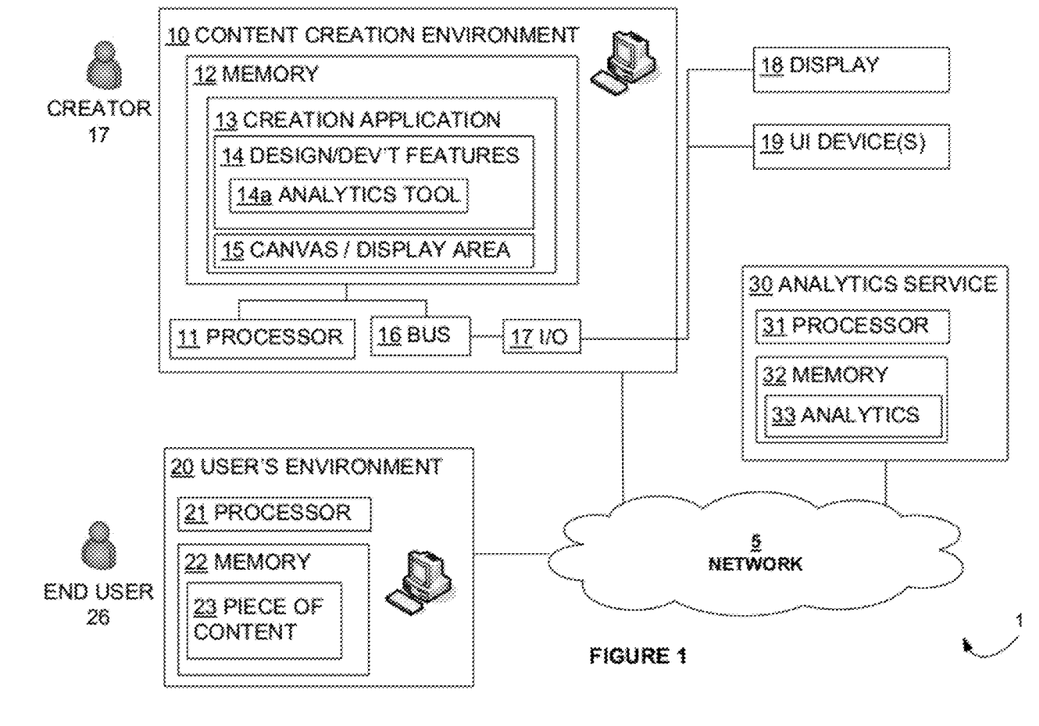
FIG. 1 is a system diagram illustrating an exemplary computing environment.

Referring now to the drawings in which like numerals indicate like elements throughout the several Figures, FIG. 1 is a system diagram illustrating an exemplary computing environment. Other computing environments may be also be used. The environment 1 shown in FIG. 1 comprises a wired or wireless network 5 connecting various network devices 10, 20, 30. Exemplary applications that execute on each of the devices 10, 20, 30 are shown as functional or storage components residing in memory 12, 22, 32 on the respective devices. The memory 12, 22, 32 may be transient or persistent. As is known to one of skill in the art, such applications may be resident in any suitable computer-readable medium and execute on any suitable processor. For example, the network devices 10, 20, 30 shown each may comprise a computer-readable medium such as a random access memory (RAM) 12, 22, 32 coupled to a processor 11, 21, 31 that executes computer-executable program instructions and/or accesses information stored in memory 12, 22, 32. Such processors may comprise a microprocessor, an ASIC, a state machine, or other processor, and can be any of a number of computer processors. Such processors comprise, or may be in communication with a computer-readable medium which stores instructions that, when executed by the processor, cause the processor to perform the steps described herein.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The network 5 shown comprises the Internet. In other embodiments, other networks, intranets, combinations of networks, or no network may be used. The devices 10, 20, 30 can be connected to a network 5 as shown. Alternative configurations are of course possible. The devices 10, 20, 30 may also comprise a number of external or internal devices such as a mouse, a CD-ROM, DVD, a keyboard, a display, audio speakers, or other input or output devices. For example, content creation environment 10 includes a display 18 and various user interface devices 19. A bus, such as bus 16, will typically be included in each of the computing devices 10, 20, 30. Exemplary analytics service 30 can be implemented on a server device. Examples of a server device are servers, mainframe computers, networked computers, a processor-based device, and similar types of systems and devices.

Content creation environment 10 includes a content creation application 13 for a creator 17 to create and edit electronic content. The creation application 13 may include various design and development features 14 and a canvas or display area 15. For example, a creator may position various graphically-displayed objects on the canvas or display area 15 to specify the appearance of the application or other content that is being created. The design and development features 14 may be used to edit and configure these graphically-displayed objects and to add functionality, animation, and event-based interactivity to those objects.

The content creation environment can be generally be used to create electronic content that is provided for use by end users. For example, end user 26 may receive a piece of content 23 in user's environment 20 and interact with the piece of content 23 in that environment. For example, the user may execute the piece of content 23 and press buttons within the content, watch video within the content, etc.

The design and development features 14 of the content creation environment 10 include an analytics tool 14a for adding analytics that are associated with one or more events that may occur in the application or electronic content that is being developed. For example, the analytics tool 14a may allow the creator 17 to specify that each time an end user uses the created electronic content and clicks on a particular button, analytics information 33 will be sent to analytics service 30 identifying that that button click event occurred. For example, when end user 26 uses the piece of content 23 in the user's environment 20 and clicks on that particular button, the piece of content executing on the user's environment 20 may send information about that button click occurring to the analytics service 30.

Content creation application 13 may be configured to facilitate use by designers. It may provide the design and development features 14 in a graphical user interface that reduces or eliminates any requirement that the creator 17 write code to implement the appearance, functionality, or analytics used in the electronic content that is being created. It may allow a content creator to import media content, such as graphics, text, sound, and animation, among other things, directly onto the canvas and display area 15 without requiring users to write code to implement those imported objects within the content editing environment. For example, a video may be imported and events associated with the video's start, end, and other timing events may be automatically associated with the video to make it a video component useable in the content that is being created. Similarly, an animation may be imported and automatically (or based on creator interactions) associated with a timeline. Certain images of the animation can, for example, be associated with keyframes of the timeline.

The exemplary configuration and uses of this exemplary computing environment are provided merely to illustrate various potential configurations that can be used to implement certain embodiments. Other configurations may of course be utilized.

Exemplary Methods of Implementing Event Analytics

The process of adding event analytics to an application, or other content can be simplified to reduce or eliminate the need to have a software developer write source code. In many instances, a designer can implement the analytics resulting in a significant reduction in application development cost. The process can be simplified to allow the creator to point and click to instrument analytics in an application or other content. Implementing content can be as simple as selecting from a menu that lists events that can be tracked. The source code can then be generated automatically and plugged into the application or other electronic content being created.

Generally, various mechanisms can be used in a content creation application to facilitate a designer's or other creator's ability to implement event analytics. Various graphical objects included in a piece of content being developed can have one or more associated runtime events. Exemplary objects include, but are not limited to, video, audio, graphics, buttons, scroll bars, text, tables, animated objects, tabs, menus, and end user input objects. When in an analytics configuration mode, selecting an object can cause the content creation application to present a menu for implementing analytics for that specific object, e.g., allowing the user to create an name for the specific event tracking instance, e.g. "BUTTON 10 WAS CLICKED", and specify other details of the event tracking In certain creation applications, objects have different states and changing to or from a state can be an event for which analytics are tracked. A button, for example, can have a pressed state when an end user clicks on the button. Entering this state is an event that could be tracked. Objects used in a content creation application can advertise or otherwise make available information about their states and other events so that the analytics tool can provide this information to a creator to facilitate selection of one or more of those state's changes or other events in the analytics configuration process.

Configuring an analytic for an object can involve creating of a custom event for a selected object. This custom event is triggered by the occurrence of the selected event and performs the function of tracking and or sending information about the occurrence of the selected event for ultimate receipt and use through an analytics or collection service.

Figure 2:
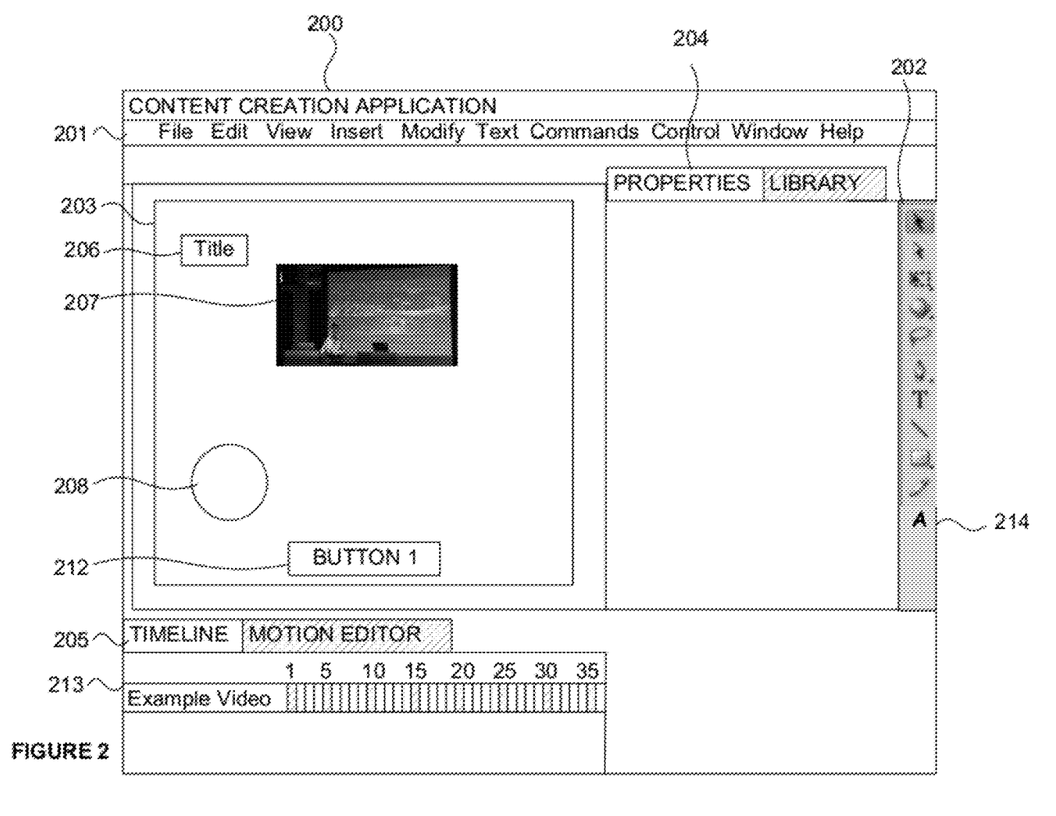
FIG. 2 is an illustration of a user interface of an exemplary content creation software application providing an analytics feature according to certain embodiments.

FIG. 2 is an illustration of a user interface 200 of an exemplary content creation software application providing an analytics feature according to certain embodiments. The user interface 200 includes a basic menu 201, an editing menu 202, an editing canvas 203, a properties area 204, and a timeline area 205. The canvas displays a title object 206, a video object 207, an animated circle object 208, and a button object 212. In this example, the editing menu 202 includes various selection, text, and drawing tools that a content creator can use to add and edit objects on the canvas 203. The editing menu can also include an analytics tool icon 214 for initiation of configuring event analytics using an analytics tool. Accordingly, a content creation environment may include a typical menu of tools or other features for editing the content, e.g., to fill in the color of a region, draw a line, and add an analytics tool in such a menu or otherwise.

Figure 3:
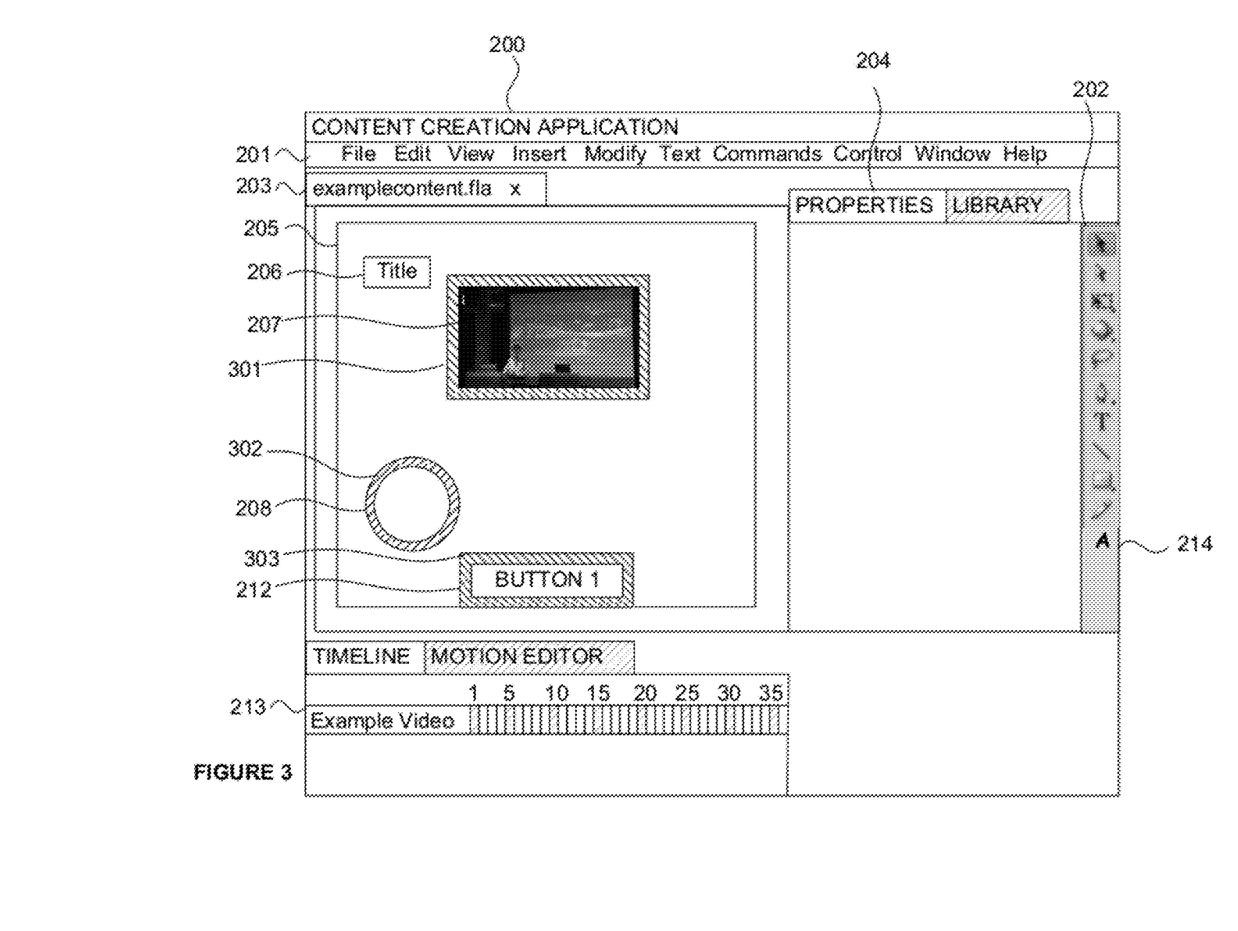
FIG. 3 is an illustration of the user interface of FIG. 2 identifying objects for which analytics are available.

FIG. 3 is an illustration of the user interface of FIG. 2 identifying objects for which analytics are available. In this example, a creator has selected the analytics tool icon 214 and the user interface 200 has changed to identify for which objects analytics are available. The canvas area displays exemplary indications 301, 302, and 303 indicating that analytics are available for the video object 207, the animated circle object 208, and the button object 212. The lack of a similar indication for the title object 206 indicates that analytics are not available for that object. Generally, objects on an editing canvas for which analytics are available can be highlighted or otherwise distinguished to guide the creator in the analytics implementation process. Selection of an analytics tool can also cause the creator's mouse or other pointer (not shown) to change in appearance to indicate that analytics are being configured.

Figure 4:
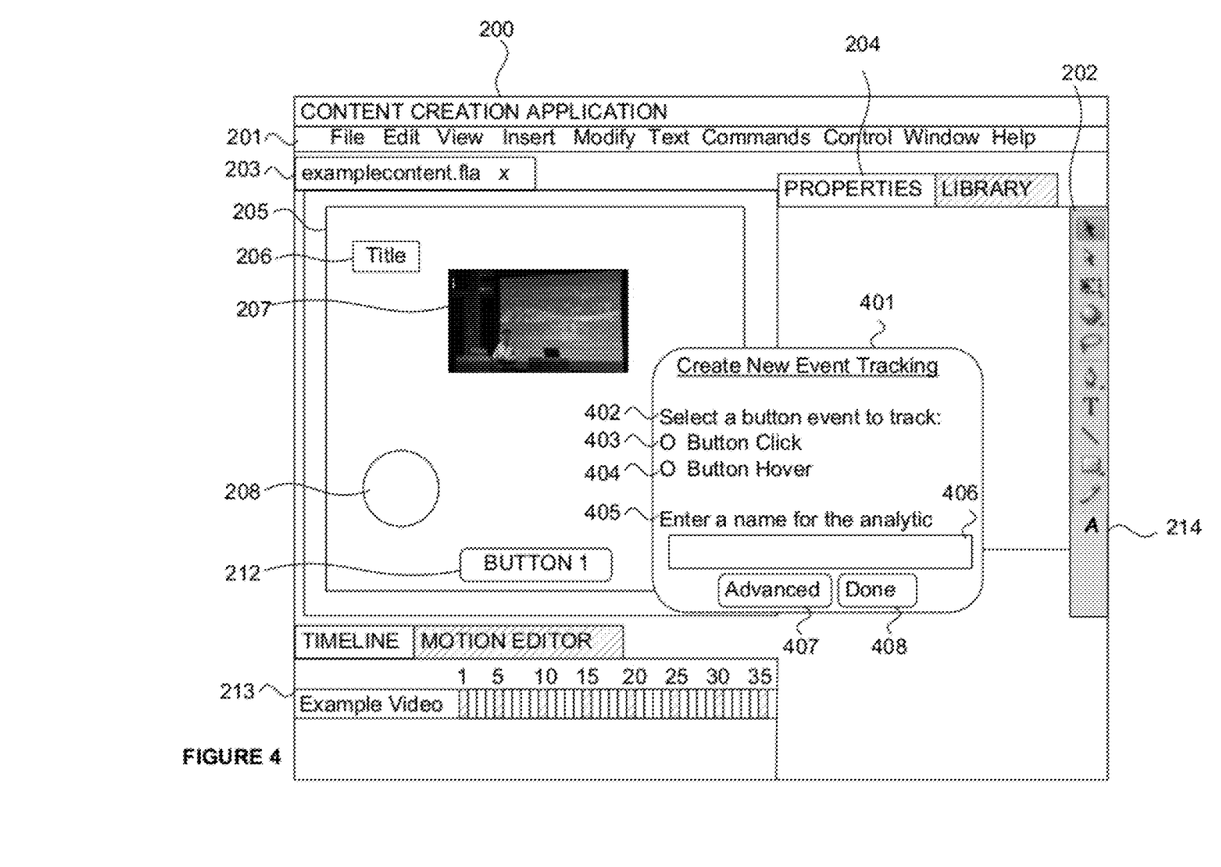
FIG. 4 is an illustration of the user interface of FIG. 2 providing a menu for adding analytics to a button type object.

While in an analytics configuration mode, selection of an object can trigger presentation of one or more menus that facilitate configuration of analytics for the selected object. FIG. 4 is an illustration of the user interface of FIG. 2 providing a menu 401 for adding analytics to a button type object. In this example, the menu 401 is presented when button type object 212 is selected. Menu 401 allows a user to specify which event associated with the button type object 212 will trigger an tracking occurrence, e.g., a button click event, a button hover event, a button hover event that last more than three seconds, etc. In this example, the menu 401 presents an instruction 402 for the creator to "Select a button event to track," and provides a selectable option for a button click event 403 and a selectable option for a button hover event 404. The menu 401 also provides an instruction 405 to "Enter a name for the analytic" and a name input area 406 for entering such a name. The advanced button 407 allows the creator to specify additional details of the analytic event tracking. However, the creator can simply select an event option 403, 404, enter a name in the name input area 406, and select the done option 408 to create a basic analytic tracking. For example, the creator may select event option 403, enter "Button1 click event" as the name, and click on the done option 408 to create basic tracking for this event. The code supporting the analytics can be automatically generated without the creator having to create, review, or test such code.

Figure 5:
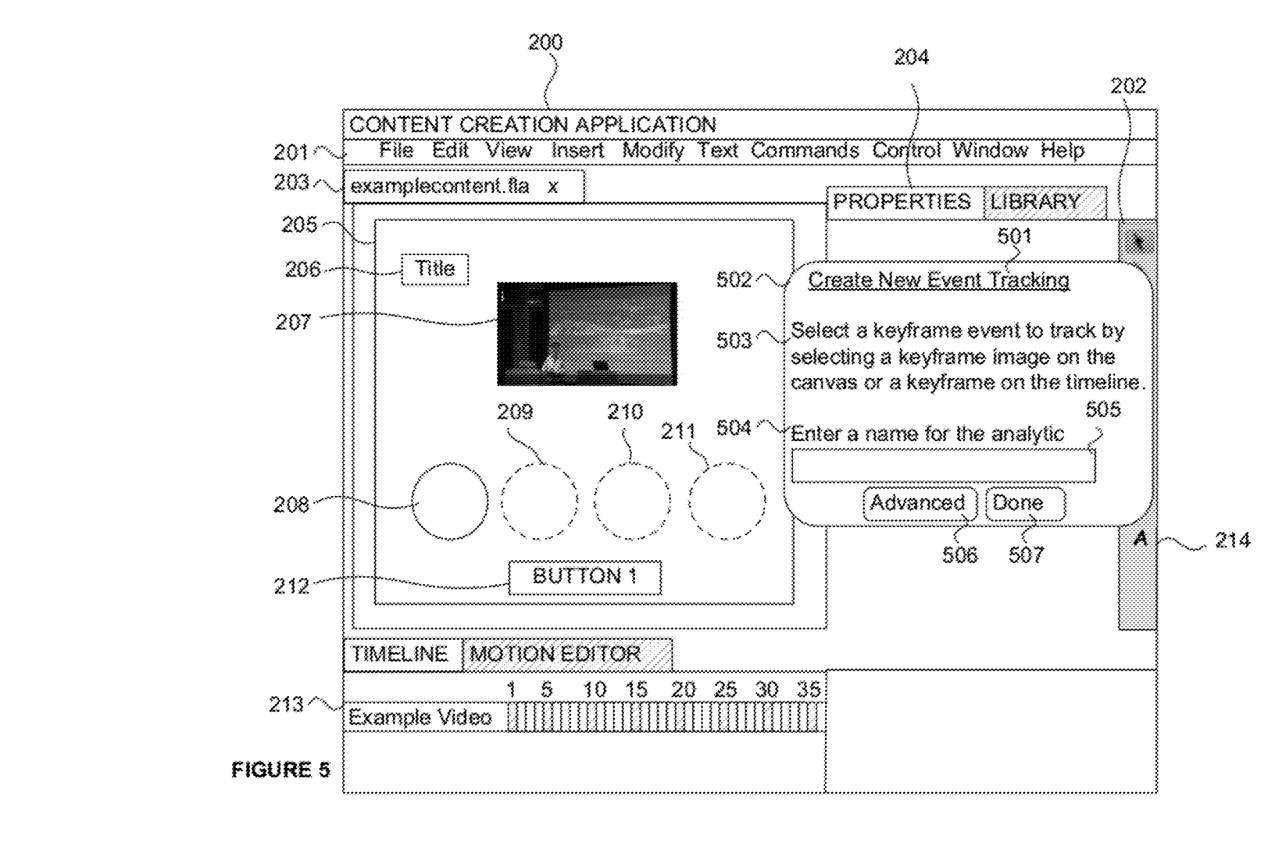
FIG. 5 is an illustration of the user interface of FIG. 2 providing a menu for adding analytics to an animated object.

The menu may differ depending on the selected object's type. FIG. 5 is an illustration of the user interface of FIG. 2 providing a menu 501 for adding analytics to an animated object. In this example, the menu 501 is presented when animated circle object 208 is selected. Menu 501 allows a user to specify which event associated with the animated circle object 208 will trigger an analytics tracking occurrence. In this example, the menu 501 presents an instruction 502 for the creator to "Select a keyframe event to track by selecting a keyframe image on the canvas or a keyframe on the timeline." Accordingly, the creator can then interact with the user interface 200 to select one of the displayed circles 208, 209, 210, 211 as the keyframe event to track or can select from the keyframes displayed in the timeline 213. As with the previous example, the menu 501 also provides an instruction 504 to "Enter a name for the analytic" and a name input area 505 for entering such a name. The advanced button 506 allows the creator to specify additional details of the analytic event tracking and the done option 507 allows the creator to complete the creation of the newly-specified event tracking.

Keyframes are typically associated with any type of content object that has a timeline associated with it, such as video, audio, and animations. In a video, for example keyframes may be associated with chapters on a DVD or a major scene change in a movie. On an audio stream, such as an audio book, keyframes may be associated with a speaker switching chapters. An animation of a dog running down the street may include a keyframe associated with the dog tripping along the way, at which time a funny sound is played. As another example, an animation may involve interpolating values using a series of four keyframes. A content creation application may display keyframe names and/or thumbnail images of those keyframes for selection by the creator configuring the analytics. Generally, analytics can be attached to the occurrence of a keyframe in any suitable way. In one embodiment, when a creator selects a component, available keyframes are separately displayed for selection.

Figure 6:
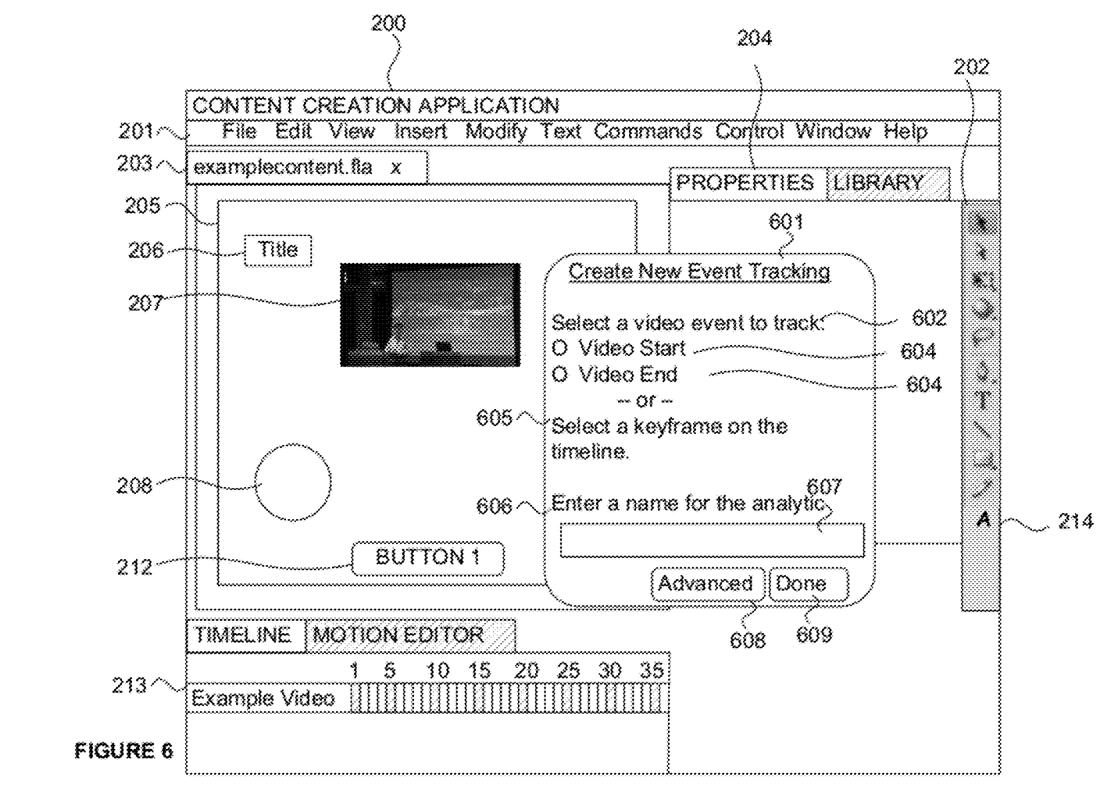
FIG. 6 is an illustration of the user interface of FIG. 2 providing a menu for adding analytics to a video object.

FIG. 6 is an illustration of the user interface of FIG. 2 providing a menu 601 for adding analytics to a video object. In this example, the menu 601 is presented when video object 207 is selected. Menu 501 allows a user to specify which event associated with the video object 207 will trigger an analytics tracking occurrence. In this example, the menu 601 presents an instruction 602 for the creator to "Select a video event to track," and provides a selectable option for a video start event 603 and a selectable option for a video end event 604. The menu 601 also presents instruction 605 for the creator to alternatively "Select a keyframe on the timeline." Accordingly, the creator can interact with the menu 601 to select an event or select from the keyframes displayed in the timeline 213. As with the previous examples, the menu 601 also provides an instruction 606 to "Enter a name for the analytic" and a name input area 505 for entering the such a name. The advanced button 608 allows the creator to specify additional details of the analytic event tracking and the done option 609 allows the creator to complete the creation of the newly-specified event tracking.

For a video, keyframes may represent some milestone in the video or some particular content that a content creator may wish to track. For example, a content producer or advertiser may want to know how many people watched a particular video for five seconds versus how many people watched the video for 15 seconds. The producer or advertiser can instrument the video with analytics, e.g., one named "video played for five seconds" and one named "video played for 15 seconds," etc., and track the number of times these events are received by the analytics or collection service.

A content creation environment may also allow analytics to be associated with content/application level events. For example, a content creator may wish to trigger analytics when a piece of content is opened, when it is closed, minimized, when the end user changes focus away from the content or switches to a different application, etc. In one exemplary content creation environment, to do so, a content creator adds analytics that relate to the entire piece of content, e.g., to the application, by selecting the outermost edge of the content being developed and interacting with a menu that presents applicable events, e.g., application start, application end, application loses focus, application gains focus, application resized, error occurred, etc. Tracking an application encountering an error can provide numerous benefits. Analytics can be configured so that whenever the application encounters an error, it sends information about the error, e.g., when the error occurred, how long the application was used before the error occurred, etc. The time an application was running prior to hitting the error could give the designer of the application useful information about the likelihood of the error.

Figure 7:
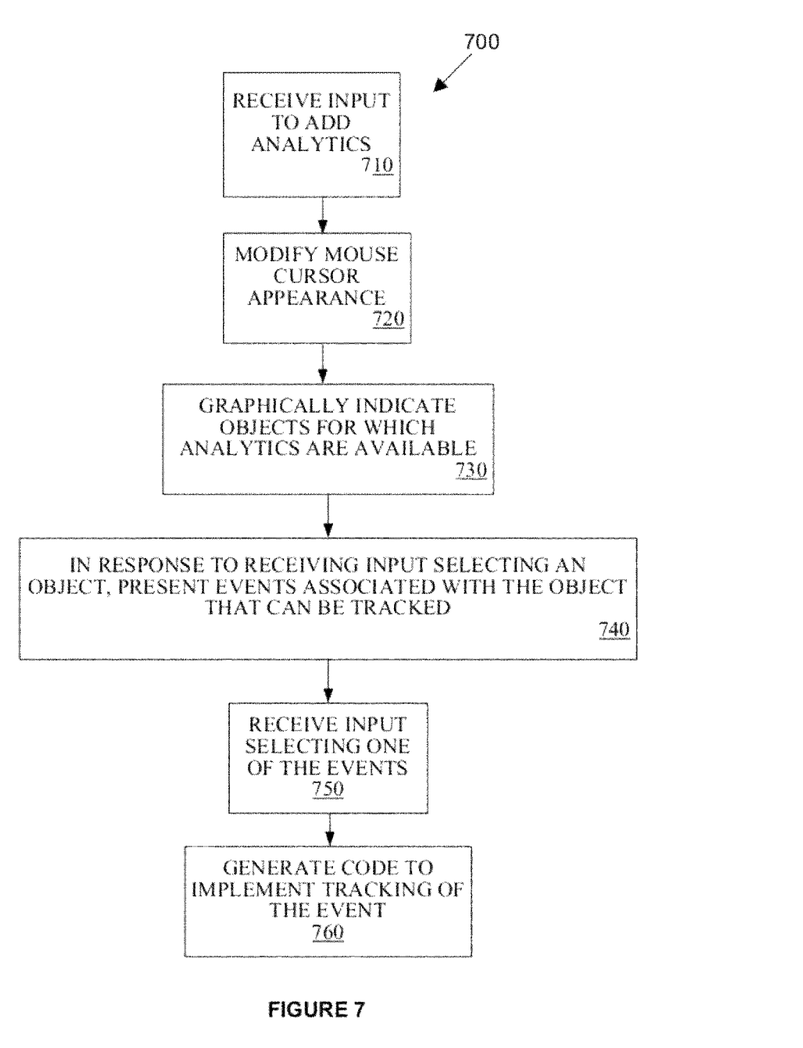
FIG. 7 is a flow chart illustrating an exemplary method of implementing event analytics in electronic content.

FIG. 7 is a flow chart illustrating an exemplary method 700 of implementing event analytics in electronic content. Method 700 can be performed in a variety of computing environments and is typically performed in a content creation application or other environment in which a creator is defining content that is being created or edited, such as content creation environment 10 of FIG. 1. The method 700 involves receiving input to add analytics, as shown in block 710. For example, this may be receiving a key stoke combination, a command identified in a drop down menu, or receiving a selection of a tool on a tool menu, such as a selection of analytics tool icon 214 for initiation of configuring event analytics in FIG. 2.

The method 700 further comprises modifying a mouse cursor appearance, as shown in block 720. The modified appearance of the cursor provides a visual indication to the designer or other content creator that the content creation environment is now in an analytic configuration mode. As examples, the appearance of the cursor may change to display an "A" shape instead of the more typically-used arrow-shaped pointer. As additional examples, the cursor may simply change colors, shape, or size.

The method 700 further involves graphically indicating objects for which analytics are available, as shown in block 730. Analytics are typically available for graphically displayed objects that have states or other events to which tracking can be attached. For example, a button component will have events associated with user interaction with the button that can be tracked. Analytics are also typically available for animations and other objects associated with one or more keyframes or timeline positions.

A content creation environment can identify the graphical objects for which analytics are available in a variety of ways. As an example, a content creation environment may search for information stored about each graphically-displayed object and identify events that are associated with those objects. Graphically indicating the objects can be accomplished using a variety of visual indicators. Such objects can be highlighted, bolded, circled, re-colored, or otherwise distinguished from objects for which analytics are not available. As another example, objects for which analytics are not available can be grayed out or otherwise displayed with an indication that such objects cannot be selected. FIG. 3, described previously, provides examples of identifying objects for which analytics are available such that such objects are visually distinguished from objects for which analytics are not available.

The method 700 further involves, in response to receiving input selecting an object, presenting events associated with the object that can be tracked, as shown in block 740. Tracking an event involves sending information about occurrences when the content is used by end users. Presenting events available for tracking can take a variety of forms. The menu 401 of FIG. 4 provides an example of a menu providing selectable options for events that can be tracked for a selected object. The user interface of FIG. 5 provides an example of events that are selectable by selecting elements of a canvas and/or timeline display. Events can also be presented as thumbnail images that correlate to keyframes. Other methods of presenting selectable events can alternatively be used.

The method 700 further involves receiving input selecting one of the events, as shown in block 750. As examples, a designer or other content creator may select an event from a menu, from an editing canvas, from a timeline, or by any other suitable means. Additional information can be received further configuring the parameters of tracking the event. For example, an event name may be received. As another example, information about where and how to send the tracking information may be received. Default parameters can be used in cases where parameters are not expressly specified. As an example, a default name can be provided for an analytic being created using the object name and the event name (e.g., "Button1ClickEvent," etc.) If the creator does not change this name, it can be used by default for the tracked event. As another example, if the content creator does not specify an analytics vendor, a preconfigured or default analytics vendor can be used automatically.

The method 700 further involves generating code implementing the tracking of the event, as shown in block 760. Such code can be generated at the time the event tracking is created or at some other time, for example, when the electronic content is compiled, published, or otherwise provided for use by end users. Generating code to implement tracking of the event can involve creating a new event that is triggered by the occurrence of the tracked event. Code is created for the new event to implement the tracking and sending features necessary to provide information about the occurrences of the tracked event to the analytics service, collection service, or other collector. The term "collector" refers generally to any device or service that can receive information about events that are tracked and may, but need not, be located remotely (geographically and/or with respect to a connecting computing network) from a content creator and/or end user.

A relatively simple menu or other user interface component can facilitate a designer's ability to configure analytics without requiring much technical sophistication. However, in addition to a basic menu for configuring basic event tracking, the user interface may present menus or other features that allow a creator to further configure more advanced features. An advanced button, such as advanced options 407, 506, and 608 of FIGS. 4, 5, and 6, can provide access to advanced parameters, including, but not limited to, options about which information is tracked and how the information is collected and provided to the analytics or collection service.

A user can control certain aspects of how and when the event is sent to the analytic service. As a specific example, menu choices may allow the creator to specify when to send information about tracked events. It may be desirable to send information about the occurrence of an event each time the event occurs, e.g., each time the end user clicks the button, send the information at the time the event occurs. The creator could thus specify that events are sent immediately and, if the end user happens to be off-line, then the event just gets thrown away. If the user is off-line, tracked event occurrences may alternatively be saved to a file so that the next time the user comes on-line the information can be transmitted.

Alternatively, if a creator is heavily implementing an application with tracked events, the creator may not want to send information every time a tracked event occurs because it might slow down the application. The creator could specify using a configuration option so that events are batched together, e.g., in groups of ten. When 10 events are accumulated, those events are all sent in a batch. A parameter may also control whether the information about the tracked event is sent over a secure channel or otherwise encrypted.

A creator can also chose additional details be sent along with the event. For example, a creator may track an application close event and attach a duration value to that event identifying the length of time the application was used. Generally, the creator can specify the inclusion of any information from the application or otherwise available to the application with the tracked event including, but not limited to, information about the type of computer, operating system type and version, and any other characteristic data about the end user's environment. Other information may be provided as well. For example if end users encounter an application error, the creator may want to know whether the end users were running on battery power on a laptop or plugged in, what language the computer was using, the current time of day, and a variety of other information that can be relevant to analytics and/or error analysis.

In addition, a content creator can identify which analytic system or vendor to use in various ways. A creator could find an analytics vendor and enter vendor information manually or could select a featured, already configured vendor. The content creation application thus could provide a list of one or more featured analytic vendors already preconfigured so the creator can simply select from a drop down list of featured vendors.

The exemplary techniques and systems disclosed herein can also facilitate improved workflow in collaborative efforts involving both designers and developers. For example, a designer may use an analytics tool of a content creation environment to create basic analytics that are then refined or fixed to the extent necessary by a developer having access to the generated code. Generally, however, it is beneficial to limit the amount of custom coding by a developer to reduce costs and reduce the likelihood of errors in the analytics.

Generally, techniques of the exemplary embodiments disclosed herein are applicable to any type of application or piece of content with events including web applications, desktop applications, television content, and mobile applications, among others. For example, a music artist may release an album and want to track how many people listen to song 7. The artist or other designer can arrange the album and use an analytic tool to instrument song 7 so that information is sent to an analytics or collection service each time song 7 is played on a device attached to the Internet, such as on a portable music player. Similarly, a television program could be configured with events that are tracked to see how many people fast-forward through commercials. As another example, an airline may include a microcontroller in every airplane seat and track how many people recline and for how long, etc. The creation of event tracking can be facilitated in creating any type of content that has events or to which events can be added.

A content creation component can further include features for editing and testing already specified analytics. For example, an inspector component can be used to check and edit existing analytics by providing the parameters of the event tracking in a menu or other editing interface. The inspector component could also be used to delete event tracking configurations that are no longer desired. As another example, a test component can be used to test the analytics by allowing the creators to interact with the canvas as if it were a running version of the electronic content and tracking the creator triggered events according to the specified analytics. The creator could then access the analytics or other collection service and confirm that analytics are being collected in the desired manner.

General

Numerous specific details are set forth herein to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing platform, such as one or more computers or a similar electronic computing device or devices, that manipulate or transform data represented as physical electronic or magnetic quantities within memories, registers, or other information storage devices, transmission devices, or display devices of the computing platform.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

As noted above, a computing device may access one or more computer-readable media that tangibly embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, televisions, television set-top boxes, and portable music players. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components or systems. It should be appreciated that such communications may occur over any suitable number or type of networks or links, including, but not limited to, a dial-in network, a local area network (LAN), wide area network (WAN), public switched telephone network (PSTN), the Internet, an intranet or any combination of hard-wired and/or wireless communication links.

Any suitable tangible computer-readable medium or media may be used to implement or practice the presently-disclosed subject matter, including, but not limited to, diskettes, drives, magnetic-based storage media, optical storage media, including disks (including CD-ROMs, DVD-ROMs, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A computer-implemented method comprising:
providing a user interface for creating electronic content, the user interface comprising a canvas for displaying objects used in electronic content being created and the user interface comprising tools for editing the appearance and functionality of the objects;
in response to receiving selection of an analytics tool to add tracking to the electronic content being created and selection of an object as a selected object, presenting events associated with the selected object that can be tracked, wherein tracking an event comprises sending information to a collector about occurrences of the event that occur when the electronic content is used;
receiving input selecting one of the events as a tracked event; and
generating instructions stored in a computer-readable medium, the instructions for implementing tracking of the tracked event in the electronic content.

2. The method of claim 1 wherein presenting events comprises presenting a menu providing selectable options for events that can be tracked for the selected object.

3. The method of claim 1 wherein presenting events comprises presenting selectable elements on the canvas.

4. The method of claim 1 wherein presenting events comprises presenting selectable elements on a timeline.

5. The method of claim 1 wherein presenting events comprises presenting selectable images associated with keyframes associated with the object.

6. The method of claim 1 further comprising, in response to receiving the input to add tracking to the content being created, modifying a mouse cursor appearance to provide a visual indication that the user interface is now in an analytic configuration mode.

7. The method of claim 1 further comprising, in response to receiving the input to add tracking to the content being created, graphically indicating objects for which tracking is available.

8. The method of claim 7 further comprising determining that tracking is available for the objects for which tracking is available by identifying objects associated with one or more events.

9. The method of claim 7 further comprising determining that tracking is available for the objects for which tracking is available by identifying objects associated one or more keyframes.

10. The method of claim 7 further comprising determining that tracking is available for the objects for which tracking is available by identifying animation objects.

11. The method of claim 7 further comprising further comprising determining that tracking is available for the objects for which tracking is available by inspecting object type information for each objects in the electronic content.

12. The method of claim 1 further comprising receiving additional input further configuring parameters of tracking the tracked event, the input relating to one or more of: an event name, information about where to send tracking information; and information about how to send tracking information.

13. The method of claim 1 further comprising creating a new event that is triggered by the occurrence of the tracked event.

14. The method of claim 13 wherein generating the instructions stored in a computer readable medium comprises generating code for the new event to implement tracking and sending information about occurrences of the tracked event to the collection service.

15. A computer apparatus comprising:
a processor processing instructions stored on a computer-readable medium to provide a user interface for creating electronic content, the user interface comprising a canvas for displaying objects used in electronic content being created and the user interface comprising tools for editing the appearance and functionality of the objects; and
an analytics component implemented by the processor processing instructions stored on the computer-readable medium, wherein the analytics component:
presents events that are associated with a selected object that can be tracked in response to selection of an analytics tool to add tracking to the electronic content being created and selection of an object on the canvas as the selected object, wherein tracking an event comprises sending information about occurrences of the event that occur when the content is used, the information sent to a collection service;
receives input selecting one of the events as a tracked event; and
generates instructions stored in a computer-readable medium, the instructions implementing tracking of the tracked event in the electronic content.

16. The computer apparatus of claim 15 wherein the analytics component creates a new event that is triggered by the occurrence of the tracked event.

17. The computer apparatus of claim 16 wherein the analytics component generating instructions stored in a computer-readable medium comprises generating code for the new event to implement tracking and sending information about occurrences of the tracked event to the collection service.

18. A tangible computer-readable storage medium on which is encoded program code, the program code comprising:
program code for providing a user interface for creating electronic content, the user interface comprising a canvas for displaying objects used in electronic content being created and the user interface comprising tools for editing the appearance and functionality of the objects;
program code for, in response to receiving selection of an analytics tool to add tracking to the electronic content being created and selection of an object as a selected object, presenting events associated with the selected object that can be tracked, wherein tracking an event comprises sending information to a collection service about occurrences of the event that occur when the electronic content is used;
program code for receiving input selecting one of the events as a tracked event; and
program code for generating instructions for implementing tracking of the tracked event in the electronic content.

19. The computer-readable medium of claim 18 wherein presenting events comprises presenting a menu providing selectable options for events that can be tracked for the selected object.

20. The computer-readable medium of claim 18 wherein presenting events comprises presenting selectable elements on the canvas.

* * * * *